United States Patent

Kim

[11] Patent Number: 6,052,570
[45] Date of Patent: Apr. 18, 2000

[54] RSSI COMPARISON CIRCUIT FOR A TIME DUPLEX SYSTEM

[75] Inventor: Kyung-Jun Kim, Incheonkwnagyeok, Rep. of Korea

[73] Assignee: Samsung Electronics Co., Ltd., Rep. of Korea

[21] Appl. No.: 08/774,461

[22] Filed: Dec. 30, 1996

[30] Foreign Application Priority Data

Dec. 29, 1995 [KR] Rep. of Korea ........................ 95-64225

[51] Int. Cl.[7] .................................................. H04B 17/00
[52] U.S. Cl. ........................................ 455/226.2; 370/252
[58] Field of Search ..................................... 370/252, 280, 370/294; 455/226.2, 277.2, 134, 239.1, 161.3, 222

[56] References Cited

U.S. PATENT DOCUMENTS 5,450,622  9/1995  Vandegraaf ............................ 455/222
5,617,060  4/1997  Wilson et al. ....................... 455/239.1

*Primary Examiner*—Chi H. Pham
*Assistant Examiner*—Maikhanh Tran
*Attorney, Agent, or Firm*—Dilworth & Barrese

[57] ABSTRACT

A Received Signal Strength Indicator (RSSI) comparison circuit provides relatively error-free operation for radio communication systems using time division duplexing according to variations of received signals. The RSSI comparison circuit includes: a first comparator for receiving a received signal at a first terminal of a first comparator and for receiving a power supply voltage through first and second resistors at a second terminal thereof; a third resistor coupled between an output terminal of the first comparator and a source of the power supply voltage; a capacitor coupled between the output terminal of the first comparator and ground; a second comparator including a first terminal coupled to an output terminal of the first comparator and a second terminal for receiving the power supply voltage through fourth and fifth resistors; and a sixth resistor coupled between an output terminal of the second comparator and the source of the power supply voltage.

6 Claims, 3 Drawing Sheets

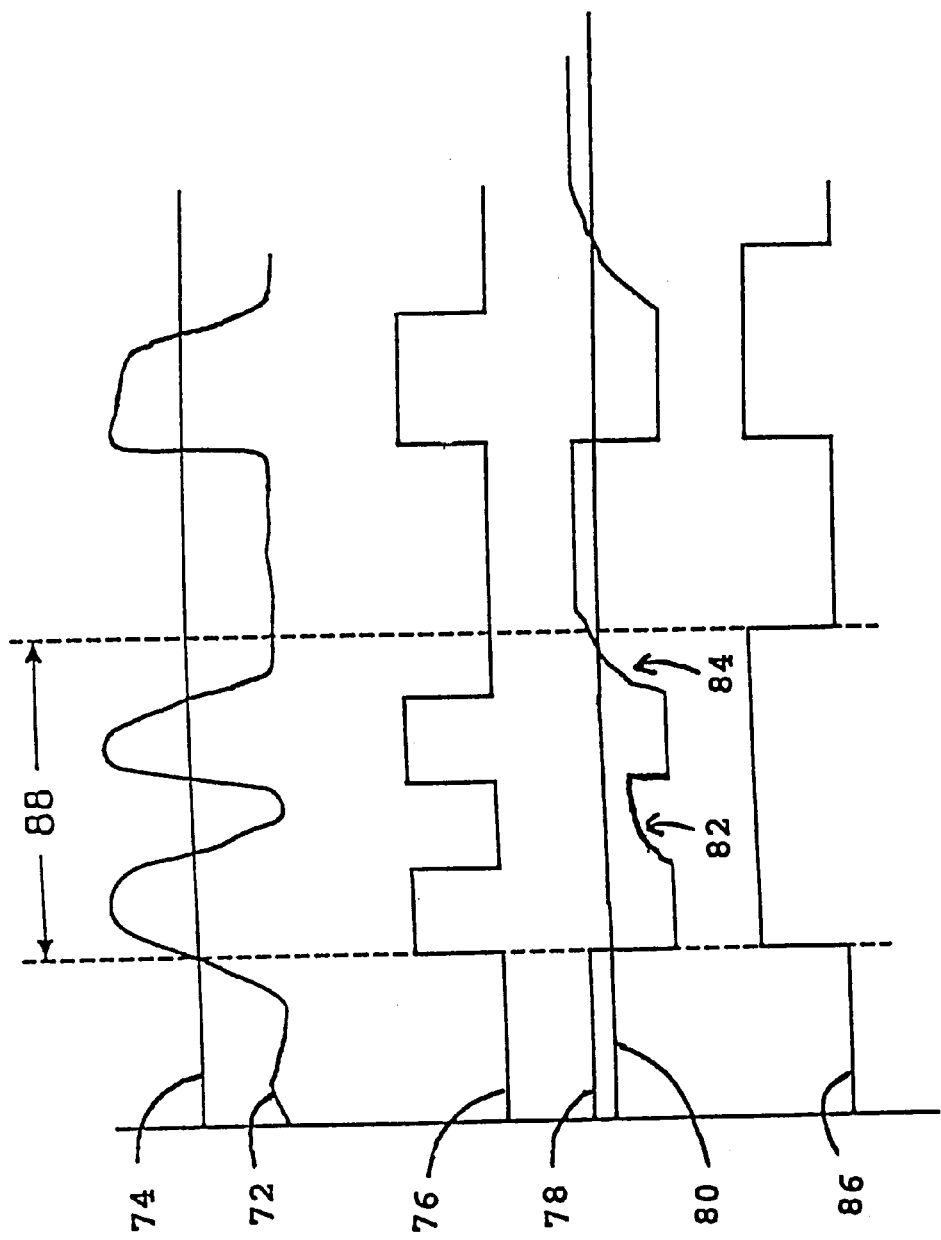

RSSI COMPARISON CIRCUIT FOR A TIME DUPLEX SYSTEM

BACKGROUND OF THE INVENTION

1. Field of the Invention

The present invention relates generally to radio communication transmitting and receiving devices. More particularly, it relates to a Received Signal Strength Indicator (RSSI) comparison circuit for performing relatively error-free operation of time division duplexing according to variations of received signals in a Time Division Duplex (TDD) system.

A RSSI comparison circuit according to the present invention is based upon the Korean Application No. 64225/1995, which is incorporated herein by reference.

2. Description of the Related Art

In general, with rapid development in the radio communications field in converting from analog systems to digital systems, time division duplex systems are replacing frequency division duplex systems for duplex communications.

In the prior art, the checking of the RSSI is a standard technique for determining the characteristics of a received signal. In using the RSSI, it is preferable to use a circuit in conformity with physical and hierarchical features of time division duplex systems.

FIG. 1 illustrates an example of a radio receiver using a time division duplex system of the prior art. Referring to FIG. 1, signals received at an antenna 2 pass a high frequency switch 4 according to control signals output from a control-logic circuit 6. The received signals are then amplified by a predetermined amplification gain value by a low-noise amplifier 8, so that undesired signals of the amplified signals can be removed by a receiving bandpass filter 10, stabilized by a buffer circuit 12, and then input to a first mixer 14. A first local signal generated by a frequency synthesizer 16 is also input to the first mixer 14, which mixes the bandpassed signal and the first local signal and outputs the mixed signals to a first intermediate frequency bandpass filter 18. A differential signal is generated and output to a second mixer 20 after filtering by the first intermediate frequency bandpass filter 18. As described above, the second mixer 20 mixes a second local signal generated by a second local signal generator 22 with the filtered signal generated by the first intermediate bandpass filter 18, and the second local signal is output to a second intermediate frequency bandpass filter 24.

The differential signal passed by the second intermediate frequency bandpass filter 24 is amplified by a predetermined gain by a limiter 25, and the amplified signal output by the limiter 25 is converted into a voice signal 32 by a frequency discriminator 28, to be output as an electrical current or voltage. Also, an RSSI indicator 26 indicates the magnitude of the signal passed by the limiter 24, which is output to the RSSI comparison circuit 30 to generate an RSSI comparison signal. The RSSI comparison signal is output as an electric signal in proportion to the indicated magnitude of the signal from the limiter 24.

FIG. 4 is a graph illustrating a characteristic waveform of received signals according to the prior art. Referring to FIG. 4, a voltage of the electric signal output by the RSSI indicator 26 is compared with a predetermined reference voltage used by the RSSI comparison circuit 30 and the results of the comparison are transmitted as a comparison value or comparison signal 34 to a controller.

FIG. 2 illustrates the RSSI comparison circuit 30 of the prior art. Referring to FIG. 2, the RSSI comparison circuit 30 includes: a comparator 42 which receives at a first terminal a received signal from an input terminal 36; a first resistor 38 with a resistance denoted as R38; a second resistor 40 with a resistance denoted as R40 and having one terminal connected to ground, in which the resistors 38, 40 are connected to a second terminal of the comparator 42; and a voltage terminal is connected to a source of a power supply voltage VCC, with the voltage terminal coupled to the output terminal through a resistor 44 connected between the output terminal of the comparator 42 and the voltage terminal connected to the source of the power supply voltage VCC.

As described above, when a corresponding voltage of the received signal 36 is higher than the predetermined reference voltage, the RSSI comparison circuit 30 immediately outputs the power supply voltage VCC as a first predetermined state. When the voltage of the received signal 36 is lower than the predetermined reference voltage, the RSSI comparison circuit 30 immediately outputs the ground voltage as a second predetermined state.

In such operations, the predetermined reference voltage may be set to $[(R40)/(R38+R40)] \times VCC$.

When the RSSI comparison circuit 30 of the prior art is applied to a receiver using time division duplexing, the received signal 36 is substantially changed during the communications in light of the operating characteristics of time division duplex systems. Further, when the voltage of the received signal 36 is compared with the predetermined reference voltage, the RSSI comparison circuits of the prior art typically output the ground voltage as the second state during the communications, which may erroneously identify a detected voltage level corresponding to ground as an interruption of transmission.

SUMMARY OF THE INVENTION

Accordingly, it is an object of the present invention to provide an RSSI comparison circuit for performing relatively error-free operation according to variations of received signals, to prevent erroneous processing of received signals such as a voltage corresponding to ground.

It is another object of the present invention to provide the RSSI comparison circuit for performing such relatively error-free operation according to variations of received signals from time division duplexing.

To achieve the above objects, an RSSI comparison circuit of a radio communication system using time division duplexing includes: a first comparator for receiving a received signal at a first terminal of the first comparator and for receiving a power supply voltage VCC through first and second resistors to a second terminal thereof; a third resistor coupled between an output terminal of the first comparator and a source of a power supply voltage; a capacitor coupled between the output terminal of the first comparator and ground; a second comparator including a first terminal coupled to the output terminal of the first comparator and a second terminal for receiving the power supply voltage through fourth and fifth resistors; and a sixth resistor coupled between the output terminal of the second comparator and the source of the power supply voltage.

Moreover, the RSSI comparison circuit responds to the input of a received signal having a voltage above a predetermined level to output a first output signal, and responds to the input of a received signal having a voltage below the predetermined level to output a second output signal.

BRIEF DESCRIPTION OF THE DRAWINGS

These and various other features and advantages of the present invention will be readily understood with reference to the following detailed description taken in conjunction with the accompanying drawings, in which:

FIG. 5 is a graph illustrating characteristic waveforms of received signals and output signals of the RSSI comparison circuits of FIGS. 2–3.

DETAILED DESCRIPTION OF THE PREFERRED EMBODIMENTS

Hereinafter, a preferred embodiment of the present invention will be discussed in detail with reference to the accompanying drawings.

Figure 3:
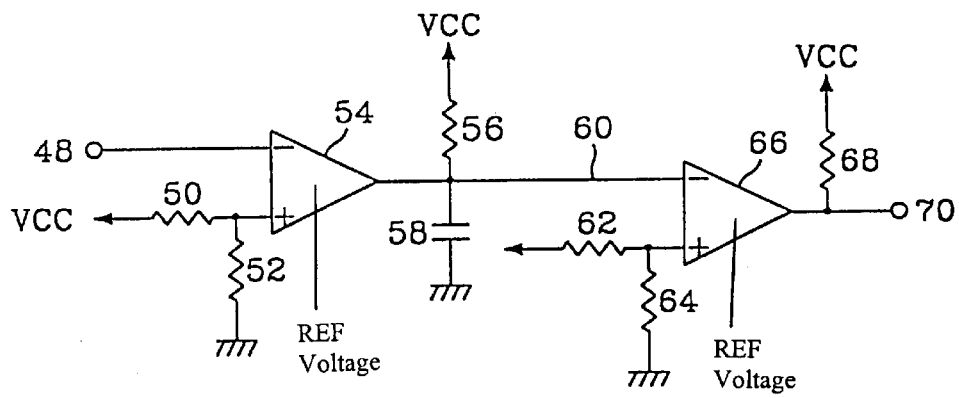
FIG. 3 shows an illustrative embodiment of the RSSI comparison circuit according to the present invention.
Figure 4:
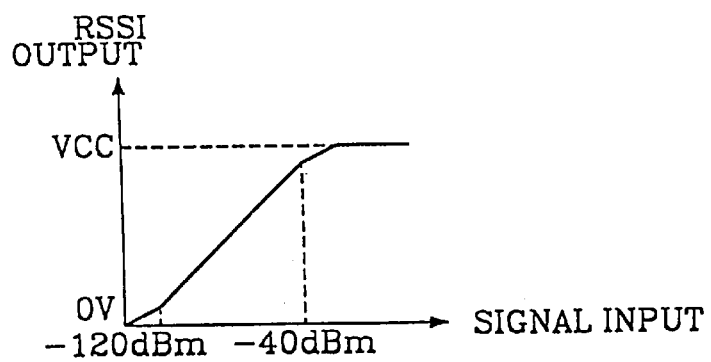
FIG. 4 is a graph illustrating a characteristic output waveform of the RSSI comparison circuit of FIG. 2 according to the prior art.

FIG. 3 shows an RSSI comparison circuit according to an illustrative embodiment of the present invention. Referring to FIG. 3, the RSSI comparison circuit includes: a first comparator 54 for receiving a received signal from an input terminal 48 to a first terminal of the first comparator 54, and for receiving a power supply voltage VCC through a first resistor 50 and a second resistor 52 at a second terminal thereof; a third resistor 56 having a resistance denoted as R56 and being coupled between an output terminal 60 of the first comparator 54 and a source of the power supply voltage VCC; a capacitor 58 having a capacitance denoted as C58 and being coupled between the output terminal 60 of the comparator 54 and ground; a second comparator 66 including a first terminal coupled to the output terminal 60 of the first comparator 54, and a second terminal for receiving the power supply voltage VCC through a fourth resistor 62 having a resistance denoted by R62, and through a fifth resistor 64 having a resistance denoted by R64; and a sixth resistor 68 coupled between the output terminal of the comparator 64 and the source of the power supply voltage VCC.

Accordingly, when the voltage of the received signal at the input terminal 48 is higher than a predetermined reference voltage of the comparator 54, the disclosed RSSI comparison circuit outputs a first voltage; for example, a voltage substantially equal to a zero voltage or a voltage corresponding to ground, as a first predetermined state. When the voltage of the received signal at the input terminal 48 is lower than the predetermined reference voltage, the disclosed RSSI comparison circuit outputs a second voltage; for example, the power supply voltage VCC, as a second predetermined state after a predetermined time delay, such as a time delay determined by an associated time constant equal to R56×C58 determined by the resistor 56 and capacitor 58 of the disclosed RSSI comparison circuit.

Typically, the predetermined reference voltage of the second comparator 66 may be (R64/(R62+R64)×VCC), as determined by resistors 62, 64 and the power supply voltage VCC. Alternatively, the predetermined reference voltage may be set to an arbitrary reference voltage, determined by the implementation of the RSSI comparison circuit, to be about 0.707×VCC in the present invention for convenience of design.

Figure 1:
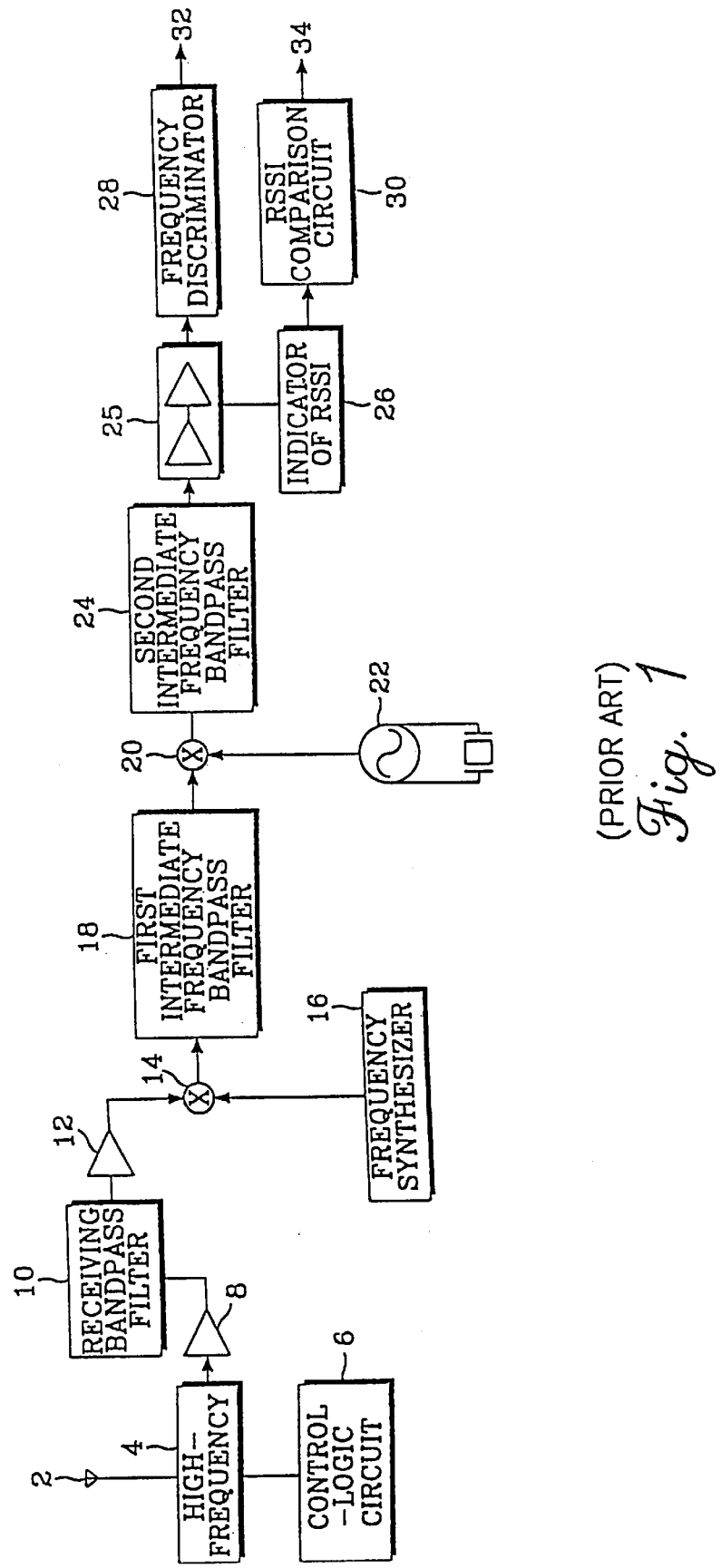
FIG. 1 shows an illustrative embodiment of a radio receiver using time division duplexing in the prior art.
Figure 2:
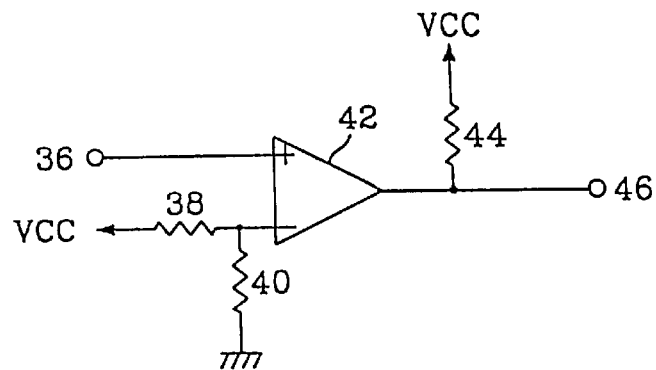
FIG. 2 shows an illustrative embodiment of the RSSI comparison circuit of the prior art.

FIG. 5 is a graph illustrating characteristic waveforms of received signals and output signals of the RSSI comparison circuit in the prior art as shown in FIG. 2, and of the RSSI comparison circuit as shown in FIG. 3. Illustrative received signals 72 received at input terminals 36, 48 of FIGS. 2–3, respectively, are shown superimposed with respect to the reference signals 74 used by the first comparators 42, 54 of FIGS. 2–3, respectively.

The waveform 76 corresponds to the output signal generated and output at output terminal 46 of the RSSI comparison circuit in FIG. 2 in the prior art. The waveform 78 corresponds to the output signals generated at the output terminal 60 of the first comparator 54 of the disclosed RSSI comparison circuit of FIG. 3, which is superimposed on the reference signal 80 used by the second comparator 66.

As shown in FIG. 5, the waveform 78 includes rising voltage levels 82, 84 due to the charging of the capacitor 58 with a duration of the rises being determined by the time constant associated with the components of the disclosed RSSI comparison circuit as described above.

The overall output waveform 86 shown in FIG. 5 illustrates the output signal generated at terminal 70 of the disclosed RSSI comparison circuit of FIG. 3 in response to the input waveform 72 received at input terminal 48.

Referring to FIG. 5, for example, there are generated two receiving/transmitting operations, during a time period 88, in which the RSSI signal generated by the prior art RSSI comparison circuit of FIG. 2 is indicated in accordance with the receiving operation according to the prior art, as shown by the waveform 76 of FIG. 5. However, for normal time division communications, during the time period 88, the appropriate RSSI waveform should be a continuous waveform such as shown by the waveform 86 of FIG. 5.

Accordingly, when a transmitting period is shorter than the time constant of R56×C58 of the disclosed RSSI comparison circuit of FIG. 3, the comparator 66 subsequently outputs the first predetermined state; for example, the zero voltage, and represents the RSSI of the received signal as a continuous waveform. As a result, the time constants used by the disclosed RSSI comparison circuit cause an increase in the waveform 78 output by the second comparator 66 for improved and relatively error-free determination of the RSSI signal for time division duplex operations.

While the present invention has been described with reference to a specific embodiments, the description is illustrative of the invention and is not to be constructed as limiting the invention. Various modifications may occur to those skilled in the art without departing from the spirit and scope of the invention.

What is claimed is:

1. A Received Signal Strength Indicator (RSSI) comparison circuit of a radio communication system using time division duplexing comprising:

a first comparator for receiving a received signal at a first terminal of the first comparator and for receiving a power supply voltage through first and second resistors at a second terminal;

a third resistor coupled between an output terminal of the first comparator and a source of a power supply voltage;

a capacitor coupled between the output terminal of the first comparator and a ground;

a second comparator including a first terminal coupled to the output terminal of the first comparator, and a second terminal for receiving a power supply voltage through fourth and fifth resistors; and a sixth resistor coupled between an output terminal of the second comparator and the source of the power supply voltage.

2. The RSSI comparison circuit as claimed in claim 1, wherein the second comparator outputs to the output terminal thereof a first voltage as a first predetermined state when a corresponding voltage of the received signal is higher than a predetermined reference voltage of the first comparator, and outputs a second voltage as a second predetermined state when the corresponding voltage of the received signal is lower than the predetermined reference voltage of the first comparator during a duration of time equal to a predetermined time constant.

3. The RSSI comparison circuit as claimed in claim 2, wherein the characteristics associated with the third resistor and the capacitor determine the predetermined time constant.

4. The RSSI comparison circuit as claimed in claim 2, wherein the second comparator outputs to the output terminal thereof the first voltage as a first predetermined state substantially immediately after determination of the corresponding voltage of the received signal being higher than a predetermined reference voltage of the first comparator.

5. The RSSI comparison circuit as claimed in claim 2, wherein the second comparator outputs the second voltage as a second predetermined state at the end of the duration of time equal to the predetermined time constant, wherein the duration of time begins upon determination of the received signal being lower than the predetermined reference voltage of the first comparator.

6. The RSSI comparison circuit as claimed in claim 5, wherein the second voltage is substantially continuously maintained during the duration of time.

* * * * *